J. Wilkinson,
Horse Power.
Nº 39,516.      Patented Aug. 11, 1863.
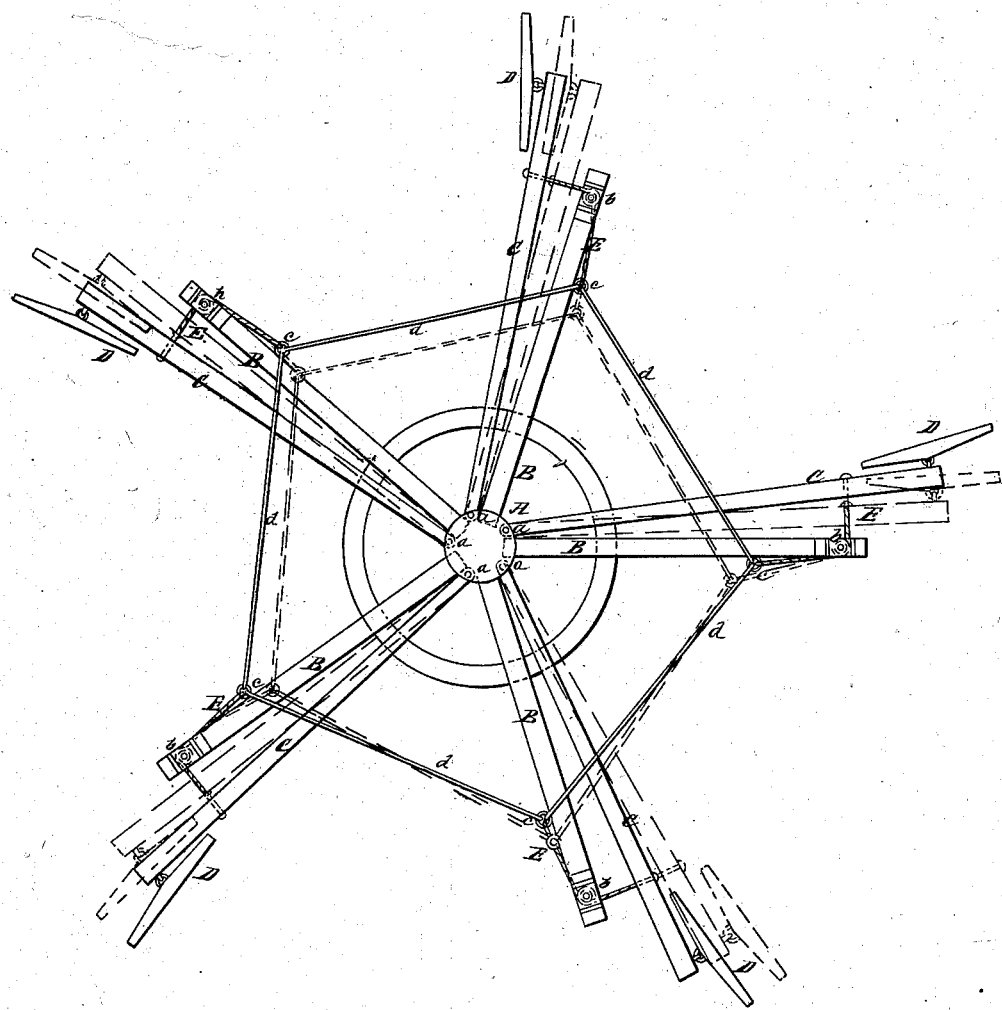
Witnesses:
Inventor:

UNITED STATES PATENT OFFICE.

JAMES WILKINSON, OF PROPHETSTOWN, ILLINOIS.

IMPROVEMENT IN EQUALIZING DRAFT IN HORSE-POWERS.

Specification forming part of Letters Patent No. 39,516, dated August 11, 1863.

*To all whom it may concern:*

Be it known that I, JAMES WILKINSON, of Prophetstown, in the county of Whiteside and State of Illinois, have invented a new and useful Draft-Equalizing Attachment for Horse-Powers; and I do hereby declare that the following is a full, clear, and exact description of the same, reference being had to the accompanying drawing, making a part of this specification, said drawing being a plan or top view of my invention.

This invention is designed to be applied to that class of horse-powers which are provided with sweeps, to which the horses are attached.

The invention consists in the employment or use of supplemental sweeps, which are attached by pivots to the driving-shaft of the device and have the whiffletrees attached to them, and are also connected with each other and with the sweeps proper in such a manner that the draft of the several horses will be equalized, as hereinafter fully shown and described.

To enable those skilled in the art to fully understand and construct my invention, I will proceed to describe it.

A represents a center piece or hub, which is attached to the driving-shaft of the horse-power, and B represents four sweeps, the inner parts of which are permanently attached to the hub.

C represents four supplemental sweeps, the inner ends of which are attached by pivots or bolts *a* to the hub A and by the sides of the sweeps B. The supplemental sweeps C are a trifle longer than the sweeps B, and they have each a whiffletree, D, attached to their inner ends.

B represents cords or chains, which are attached one to each supplemental sweep C. These cords or chains pass around pulleys *b*, which are fitted in the outer parts of the sweeps B, and are attached at their inner ends to rings *c*, which are all connected by rods *d*, as plainly shown in the drawing. By this arrangement it will be seen that all the supplemental sweeps C are connected together, and in case of any one supplemental sweep, C, being moved forward or outward from the sweep B behind it all the others will be drawn backward toward their sweeps, B. Hence it will be seen that when the horses are attached to the several sweeps C, the draft will be equalized, each animal being made to perform his share of the work, and a uniform motion will be obtained, as one animal, if more ambitious than another, cannot exert his power wholly upon the machine, but also upon the supplemental sweeps C, to which the other horses are attached, and the extra power is applied to or made to act in restraining or drawing back the other animals. Thus it will be seen that the draft will be equalized and each animal will be made to pull equally.

Having thus described my invention, what I claim as new, and desire to secure by Letters Patent, is—

The supplemental sweeps C, sweeps proper, B, cords or chains E, and rods *d*, combined and arranged to operate in the manner as and for the purpose herein set forth.

JAMES WILKINSON.

Witnesses:
ANDREW WILKINSON,
A. H. WRIGHT.